US007897669B2

(12) United States Patent
Foerg et al.

(10) Patent No.: US 7,897,669 B2
(45) Date of Patent: Mar. 1, 2011

(54) ADDITIVE FOR IMPROVING THE EARLY RESISTANCE TO DRIVING RAIN OF COATING COMPOSITIONS AND THE USE THEREOF

(75) Inventors: Christian Foerg, Dillishausen (DE); Klaus Gebauer, Langerringen-Gennach (DE); Herbert Muenzenberger, Wiesbaden (DE); Sebastian Simon, Landsberg (DE)

(73) Assignee: Hilti Aktiengesellschaft, Schaan (LI)

( * ) Notice: Subject to any disclaimer, the term of this patent is extended or adjusted under 35 U.S.C. 154(b) by 0 days.

(21) Appl. No.: 12/459,615

(22) Filed: Jul. 2, 2009

(65) Prior Publication Data

US 2010/0010134 A1 Jan. 14, 2010

(30) Foreign Application Priority Data

Jul. 8, 2008 (DE) .................. 10 2008 032 084

(51) Int. Cl.
*C08K 5/10* (2006.01)
*C08K 3/28* (2006.01)
(52) U.S. Cl. ...................................... 524/317; 524/428

(58) Field of Classification Search ............... 524/317
See application file for complete search history.

(56) References Cited

U.S. PATENT DOCUMENTS 6,075,079 A * 6/2000 Helmer et al. .............. 524/253

* cited by examiner

*Primary Examiner*—Ling-Siu Choi
*Assistant Examiner*—Hui Chin
(74) *Attorney, Agent, or Firm*—Abelman, Frayne & Schwab

(57) ABSTRACT

An additive for improving the early resistance to driving rain of physically curing coating compositions based on an aqueous acrylate dispersions, which have been adjusted to an alkaline pH with an inorganic or organic base, which is volatile at ambient temperature, is formed of an aqueous dispersion, containing a polyethyleneimine with a number average molecular weight in the range from 50,000 to 3,000,000, at least one representative of the group comprising 1,3-dihydroxy-2,2,4-trimethylpentane and esters thereof, butyl diglycol acetate and methoxypropanol as film-forming agents and at least one representative of the group comprising the liquid acrylates and pyrogenic silica as thickening agent, as well as optionally a pigment and optionally an ammonium acrylate as pigment disperser, and the use thereof.

14 Claims, No Drawings

ADDITIVE FOR IMPROVING THE EARLY RESISTANCE TO DRIVING RAIN OF COATING COMPOSITIONS AND THE USE THEREOF

BACKGROUND OF THE INVENTION

1. Field of the Invention

The subject matter of the present invention is an additive for improving the early resistance to driving rain of physically curing coating compositions based on aqueous acrylate dispersions, which are adjusted with an inorganic or organic base, which is volatile at ambient temperature, to an alkaline pH, and the use thereof.

2. Description of the Prior Art

Physically curing coating compositions based on aqueous acrylate dispersions, which contain, as essential components, an aqueous acrylate latex, inorganic fillers and conventional ancillary materials such as defoamers, plasticizers, preservatives, extenders, wetting agents, dispersants and thickeners, are used on a large scale for coating surfaces exposed temporarily to the effects of weather. The strictly physical drying of the coating composition is the disadvantage of such systems, especially when they are used as fire protection coatings, which requires the use of wet layers with a thickness of 3 mm or more. On the one hand, such drying depends greatly on environmental conditions, especially on the relative humidity and on the temperature. On the other, if a skin is formed quickly, the further drying of the film slows down due to the resulting vapor barrier. At the present time, accordingly, either long drying times are accepted or there is a changeover to solvent-containing systems or systems having a high solids content. Such systems are based on clearly more expensive raw materials and, due to solvent vapors, represent a possible danger to man and the environment.

Rapidly drying, physically curing coating compositions work according to the flocculation principle, which consists therein that the coating composition contains an ionically stabilized binder and an alkylamine or ammonium hydroxide as volatile base. After the coating composition is applied, the volatile base evaporates, which leads to the drying and curing of the binder.

The DE 199 56 128 A1 describes fast drying, aqueous coating compositions, which contain an aqueous binder and at least one water-soluble, quaternary poly(allylamine) and, with that, exhibit accelerated drying properties without discoloring noticeably during the drying.

The European patent EP 0 804 514 B1 already discloses a fast curing aqueous coating composition, which is used particularly as a paint for street markings and, very soon after it is applied on the surface of a traffic route, forms a hard, grease-resistant surface, which permits normal traffic to be resumed with a minimum interruption. This coating composition comprises 90 to 99.6% by weight of an anionically stabilized, aqueous emulsion of a copolymer of ethylenically unsaturated monomers, which contains a polyimine with a molecular weight of 250 to 20,000 and a volatile base. With such a coating composition, it becomes possible to produce fast drying coatings with a wet film thickness of only up to 0.5 mm.

However, such coating compositions are not suitable for producing thicker applied layers, particularly when the surfaces, which are to be treated, extend vertically, as is customary, in addition to the horizontal application, in the case of a fire-protection coatings for a façade application. Moreover, the rapid curing of previously known coating compositions is achieved by a rapid formation of a surface film, which, because of the decreased diffusion of water vapor through the surface film, leads to unsatisfactorily long curing times in the case of thicker layers, which is serious especially when a vigorous rain, such as a driving rain, occurs after the application of the coating composition and can cause components of the coating composition to wash or bleed out or the whole coating to be washed off. Accordingly, the thin surface layer may be destroyed by the impact of the rain and the uncured material underneath may be washed off.

A further disadvantage of such physically curing coating compositions based on aqueous acrylate dispersions is seen to lie therein that, before they are cured, their resistance to driving rain is inadequate. Driving rain is defined as a heavy rain, the drops of which, depending on the drop size and the wind velocity, can result in damage to a water-based coating composition, which has not yet cured, in that surface regions, which have not yet cured sufficiently, are washed out or beaten out of an application joint. This may lead to a bleeding of the fillers contained in the coating composition or, in the case of a breakdown, to a decreased strength of the coating film that finally cures. This is particularly serious for coating multistory façades, the lower coating regions of which, which have not yet been cured adequately, may be washed out in the event of a heavy rainfall. Both lead to a decreased tightness with respect to smoke or gas up to the tearing of the coating by movement of the treated surface with failure of the protective action resulting therefrom in the case of a fire.

The occurrence of driving rain must therefore be taken into consideration for the construction of building structures. Resistance to driving rain accordingly is understood to be the property of a surface to withstand this heavy rain permanently.

However, it is also of great importance to achieve a sufficiently large early resistance to driving rain, that is, the property of a physically curing coating composition based on aqueous acrylate dispersions to withstand the effect of such a driving rain even shortly after the application of the composition and before the complete curing thereof. Such water-based coating compositions, after the application thereof on the surface to be treated, pass through a period of time, the curing phase, during which the coating composition is water soluble and, accordingly, not resistant to driving rain. This is necessarily the case with the water-based systems normally used, since said systems are intended to be water-soluble during the processing and are intended to be cleaned off easily with water. Within the scope of the present invention, the period of time between this system-inherent lack of resistance to driving rain, from the application on the surface to be treated up to the time at which resistance to driving rain is achieved, is referred to as early resistance to driving rain. The shorter the early resistance to driving rain of such a water-based coating composition, the less is the risk of damage by any driving rain, which may occur, to a freshly applied coating before the latter has cured.

It is an object of the present invention now to indicate an additive, with which an improvement in the early resistance to driving rain of physically curing coating compositions based on aqueous acrylate dispersions can be attained, wherein the physically curing coating composition is to cure more rapidly and, with that, attain early resistance to driving rain and is not to form a skin, which prevents further necessary drying, or merely a thickened coating composition, which is incapable of withstanding driving rain. Moreover, in comparison to conventional coating compositions of the type under consideration, the drying time is to be shortened significantly over a wide range of temperatures and relative humidities and this is to be accomplished with a slight amount of additive.

SUMMARY OF THE INVENTION

The invention accordingly relates to an additive for improving the early resistance to driving rain of physically curing coating compositions based on aqueous acrylate dispersions, which have been adjusted to an alkaline pH with an inorganic or organic base volatile at ambient temperatures, which additive is characterized by an aqueous dispersion, containing a polyethyleneimine with a number average molecular weight in the range of 50,000 to 3,000,000, at least one representative of the group comprising 1,3-dihydroxy-2,2,4-trimethylpentane and esters thereof, butyl diglycol acetate and methoxypropanol as film-forming agents and at least one representative of the group comprising liquid acrylates and pyrogenic silica as thickening agents, as well as optionally a pigment and optionally an ammonium acrylate as pigment disperser.

Due to the use of the necessary components, the inventive coating composition enables accelerated drying owing to the fact that the water, contained in the coating composition, can evaporate azeotropically, the minimum film-forming temperature is lowered, a cover cross linking is attained, which promotes the formation of a film of the primary polymer at the surface and, after the first formation of a film, a hydrophobic surface is produced, which decreases the penetration of water, such as rain water, into the coating, but does not significantly reduce the diffusion of water vapor into the atmosphere.

If the inventive additive is incorporated in an amount of 1.0 to 5.0% by weight, for example, of 2.5% by weight into the coating composition, a shortening of the curing time from 24 hours to 8 hours can be achieved at 23° C. and a relative humidity of 50%. A correspondingly accelerated film formation can also be attained at other temperatures, such as 5° C. or 40° C., and other relative humidities of 50% and 90%.

In accordance with a preferred embodiment, the polyethyleneimine, used according to the invention, has a number average molecular weight ranging from 500,000 to 2,000,000 and especially of 2,000,000. The number average molecular weight of the polyethyleneimine used according to the invention is measured in the usual way by gel permeation, chromatography using polyethyleneimine of known molecular weight as the calibrating standard. A particularly preferred polyethyleneimine is available commercially from BASF under the name of Lupasol SK.

As film-forming agent, the inventive coating composition preferably contains 1,3-dihydroxy-2,2,4-trimethylpentane, 1,3-dihydroxy-2,2,4-trimethylpentane monopropionate, 1,3-dihydroxy-2,2,4-trimethylpentane dipropionate, 1,3-dihydroxy-2,2,4-trimethylpentane monoisopropionate, 1,3-dihydroxy-2,2,4-trimethylpentane diisopropionate, 1,3-dihydroxy-2,2,4-trimethylpentane monobutyrate, 1,3-dihydroxy-2,2,4-trimethylpentane dibutyrate, 1,3-dihydroxy-2,2,4-trimethylpentane monoiso-butyrate and 1,3-dihydroxy-2,2,4-trimethylpentane diisobutyrate, or also mixtures of one or more of these compounds.

A thickening agent, which is used in the form of a liquid acrylate or of a pyrogenic silica, is a further essential component of the inventive coating composition. In this connection, an aqueous solution of an acrylate copolymer, with a solids content of 20 to 40% by weight and preferably of 30% by weight, a density of 1.06 and a pH of about 3, is particularly preferred. Thixol 53L, which is obtainable commercially in the form of an aqueous solution with a solids content of 30% by weight, is especially preferred.

The inventive coating composition may optionally contain an organic and/or an inorganic pigment, preferably $Fe_3O_4$ or zinc borate or carbon black, as well as a pigment disperser, such as a polymer based on ammonium acrylate with a solids content of 35% and a pH of between 7.5 and 9.5.

A particularly preferred embodiment of the inventive additive is in the form of an aqueous dispersion, which contains 42.7 to 46.7% by weight of the polyethyleneimine, 20.8 to 23.8% by weight of film-forming agent, 0.8 to 3.6% by weight of liquid acrylate, 0 to 1.0% by weight of pyrogenic silica, 8.0 to 12.0% by weight of pigment, 0.0 to 1.0% by weight of pigment disperser and water as remainder.

A further object of the invention is a method of improving the early resistance to driving rain of physically curing coating compositions based on aqueous acrylate dispersions, which are adjusted to an alkaline pH with ammonium hydroxide or an aminoalcohol, such as aminoethanol, which is readily volatile at the application temperature, by using the above-described additive. Upon contact of the applied coating composition with air, the alkaline pH is shifted to a value of around 7. The inventive use consists therein that 1.0 to 5% by weight, preferably 2.0 to 3.0% by weight and particularly 2.5% by weight of the additive, defined above, is incorporated into the coating composition before the use as intended and mixed uniformly therewith. This can readily be checked visually by using a pigment in the additive.

Particularly advantageously, the inventive additive is incorporated into conventional commercial fire-protection coating compositions, which contain an aqueous acrylate latex, as well defoamers, plasticizers, preservatives, fillers, extenders, wetting agents, dispersants and thickeners as conventional ancillary materials and are adjusted to a pH in the range from 8.0 to 9.0 and preferably of 8.5 with ammonium hydroxide or an aminoalcohol, such as aminoethanol, which is readily volatile at ambient temperatures.

By using the inventive additive, rapid drying up to resistance to rain and stability against washing out of the film, which may have a wet film thickness of several millimeters, can be achieved with the inventive coating composition even at low temperatures and high relative humidities. The optional addition of the additive to conventional coating compositions, especially fire protection compositions, enables the user to be flexible and to employ the inventive additive when needed, especially in the case of a threatening downpour. Due to the more rapid drying, achieved according to the invention, earlier resistance to driving rain is attainable and, with that, an intact film is assured, which has adequate permeability to water vapor and, with that, makes the necessary drying possible and, at the same time, produces a cured dry coating, which ensures the fire protection aimed for, as well as the tightness to smoke and gas and, with that, guarantees the main requirements of the fire protection properties of the coating composition.

DETAILED DESCRIPTION OF THE PREFERRED EMBODIMENTS

The preferred embodiments of the invention will now be discussed with reference to the following examples and comparison examples.

Example 1

The inventive additive is prepared by mixing the following components:
 46.4% by weight of polyethyleneimine with a number average molecular weight of 2,000,000 (Lupasol SK)
 23.2% by weight of 1,3-dihydroxy-2,2,4-trimethylpentane diisobutyrate (Texanol)

1.6% by weight of an aqueous solution of an acrylate copolymer with a solids content of 30% (Thixol 53L)

4.6% by weight of black iron oxide pigment ($Fe_3O_4$ 1309-38-2)

24.2% of water as remainder.

A liquid additive mixture is obtained, which can be incorporated readily in a water-based, physically curing coating composition of the aqueous, acrylate dispersion type.

Example 2

Application Example

A conventional fire-protection composition of the following composition is used:

55% by weight of an aqueous acrylate dispersion

10% by weight of water

28% by weight of chalk and/or aluminum hydroxide as a mixed filler

1% by weight of ammonium hydroxide

6% by weight of conventional ancillary materials.

The aqueous acrylate dispersion is an aqueous dispersion of an ethyl acrylate/2-ethylhexyl acrylate/acrylonitrile/acrylic acid/N-methylol acrylamide copolymer with a solids content of 58% by weight and a particle size distribution of the copolymer ranging from 0.2 to 0.4 µm.

Defoamers, plasticizers, preservatives, wetting agents, fungicides, pigments and thickeners are contained as conventional ancillary materials The fire protection composition is adjusted to a pH of 8.5 with ammonium hydroxide.

Into this fire protection composition, 2.5% by weight of the additive mixture of Example 1 is incorporated until a homogeneous color is achieved.

The mixture, obtained in this way, can be processed for a period of at least 3 hours. The drying time, until an early resistance to driving rain is attained at 23° C. and a relative humidity of 50%, is decreased from 24 hours to 8 hours for fire protection coating compositions with the additive.

In this connection, the early resistance to driving rain is understood to be the earliest time, at which a coating sample can withstand the driving rain resistance test without damage. This test consists of allowing drops of water to fall uniformly at room temperature from a height of 4 m onto the coating sample, which is arranged at an angle of 45°, at a rate of 250 mL in 15 minutes. On the average, 4 drops per second fall on the sample. The test is regarded as having been passed if the sample withstands the test without damage. The earliest drying time, at which the test is passed, is determined.

For determining the resistance to washing out, water is allowed to flow uniformly in an amount of 1 L/minute over a coating sample, which is also inclined by 45°. The test is regarded as having been passed if the cycled water does not become cloudy during a test time of 30 minutes and the sample is not washed out of the sample plate.

In this case also, the earliest drying time, at which the sample passes the test, is determined.

The following Table shows the earliest drying times for the fire protection composition with and without the inventive additive, at which the resistance to driving rain or washing out, determined in the above manner, is attained.

TABLE 1

Earliest times at which resistance to rain is attained

|  | 5° C./ 80% R.H. | 25° C./ 80% R.H. | 40° C./ 80% R.H. |
|---|---|---|---|
| Without additive | 40 | 28 | 18 |
| With additive | 15 | 7.5 | 4.5 |

TABLE 2

Earliest times at which resistance to washing out is attained

|  | 5° C./ 80% R.H. | 25° C./ 80% R.H. | 40° C./ 80% R.H. |
|---|---|---|---|
| Without additive | 40 | 23 | 12 |
| With additive | 10 | 5.5 | 3 |

As is evident from the Tables above, an improvement in the resistance to driving rain by a factor of 3 to 4 and in the resistance to washing out by a factor of 4 is achieved by using the inventive additive in the given fire protection composition.

Though the present invention was shown and described with references to the preferred embodiment, such is merely illustrative of the present invention and is not to be construed as a limitation thereof and various modifications of the present invention will be apparent to those skilled in the art. It is therefore not intended that the present invention be limited to the disclosed embodiment or details thereof, and the present invention includes all variations and/or alternative embodiments within the spirit and scope of the present invention as defined by the appended claims.

What is claimed is:

1. An additive for improving the early resistance to driving rain of physically curing coating compositions based on an aqueous acrylate dispersions, which have been adjusted to an alkaline pH with an inorganic or organic base, which is volatile at ambient temperature, comprising an aqueous dispersion containing a polyethyleneimine with a number average molecular weight in the range from 50,000 to 3,000,000, at least one representative of the group comprising 1,3-dihydroxy-2,2,4-trimethylpentane and esters thereof, butyl diglycol acetate and methoxypropanol as film-forming agents, and at least one representative of the group comprising the liquid acrylates and pyrogenic silica as thickening agent, as well as optionally a pigment and optionally an ammonium acrylate as pigment disperser.

2. The additive of claim 1, wherein it contains a polyethyleneimine with a number average molecular weight in the range from 500,000 to 2,500,000.

3. The additive of claim 1, wherein it contains at least one representative of the group comprising 1,3-dihydroxy-2,2,4-trimethylpentane, 1,3-dihydroxy-2,2,4-trimethylpentane monopropionate, 1,3-dihydroxy-2,2,4-trimethylpentane dipropionate, 1,3-dihydroxy-2,2,4-trimethylpentane monoiso-propionate, 1,3-dihydroxy-2,2,4-trimethylpentane diisopropionate, 1,3-dihydroxy-2,2,4-trimethylpentane monobutyrate, 1,3-dihydroxy-2,2,4-trimethyl-pentane dibutyrate, 1,3-dihydroxy-2,2,4-trimethylpentane monoiso-butyrate and 1,3-dihydroxy-2,2,4-trimethylpentane diisobutyrate as film-forming agents.

4. The additive of claim 1, wherein, as liquid acrylate, it contains an aqueous solution of an acrylate copolymer with a solids content of 20 to 40% by weight, a density of 1.06, and a pH of about 3.

5. The additive of claim 1, wherein it contains an organic pigment and inorganic pigment.

6. The additive of claim 1, wherein it contains an ammonium acrylate, with a solids content of 35% and a pH between 7.5 and 9.5, as pigment disperser.

7. The additive of claim 1, comprising an aqueous dispersion containing 42.7 to 46.7% by weight of polyethyleneimine, 20.8 to 23.8% by weight of film-forming agent, 0.8 to 3.6% by weight of liquid acrylate, 0 to 1.0% by weight of pyrogenic silica, 8.0 to 12.0% by weight of pigment, 0.0 to 1.0% by weight of pigment disperser, and water as remainder.

8. A method of improving the early resistance to driving rain of physically curing coating compositions based on aqueous acrylate dispersions, which are adjusted to an alkaline pH with ammonium hydroxide or an aminoalcohol, which is readily volatile at ambient temperature, comprising the steps of providing an additive having an aqueous dispersion containing a polyethyleneimine with a number average molecular weight in the range from 50,000 to 3,000,000, at least one representative of the group comprising 1,3-dihydroxy-2,2,4-trimethylpentane and esters thereof, butyl diglycol acetate and methoxypropanol as film-forming agents, and at least one representative of the group comprising the liquid acrylates and pyrogenic silica as thickening agent, as well as optionally a pigment and optionally an ammonium acrylate as pigment disperser; and incorporating 1.0 to 5.0% by weight of the additive in a coating composition.

9. The method of claim 8, wherein 2.0 to 3.0% by weight of the additive is incorporated in the coating composition.

10. The method of claim 8, wherein the additive is incorporated into a conventional commercial fire protection coating composition, which contains an aqueous acrylate latex as well as defoamers, plasticizers, preservatives, fillers, extenders, wetting agents, dispersants and thickeners as conventional ancillary materials and is adjusted with ammonium hydroxide or aminoethanol to a pH in the range from 8.0 to 9.0.

11. The method of claim 10, wherein the additive is adjusted with ammonium hydroxide or aminoethanol to a pH of 8.5.

12. The additive of claim 4, wherein an aqueous solution of the acrylate copolymer has the solids content of 30% by weight.

13. The additive of claim 1, wherein it contains one of organic pigment and inorganic pigment.

14. The additive of claim 1, wherein it contains one of $Fe_3O_4$ and carbon black.

* * * * *